(12) United States Patent
Kaiser et al.

(10) Patent No.: US 7,055,506 B2
(45) Date of Patent: Jun. 6, 2006

(54) FUEL CONTROL SYSTEM FOR A DUAL FUEL INTERNAL COMBUSTION ENGINE

(75) Inventors: Stuart Kaiser, Clontarf (AU); Michael Eve, Wellington Point (AU)

(73) Assignee: CSSM Holdings Pty Ltd, Clontarf (AU)

( * ) Notice: Subject to any disclaimer, the term of this patent is extended or adjusted under 35 U.S.C. 154(b) by 0 days.

(21) Appl. No.: 11/024,036

(22) Filed: Dec. 29, 2004

(65) Prior Publication Data

US 2006/0021604 A1    Feb. 2, 2006

(51) Int. Cl.
F02B 43/02   (2006.01)
G06F 19/00   (2006.01)

(52) U.S. Cl. .................. 123/527; 701/103

(58) Field of Classification Search ........... 123/1 A, 123/27 GE, 525–529; 48/180.1, 190; 701/101, 701/102, 103, 115; 73/116, 117.3, 118.1; 340/426.16, 438, 439
See application file for complete search history.

(56) References Cited

U.S. PATENT DOCUMENTS

| | | | | |
|---|---|---|---|---|
| 4,522,159 A | * | 6/1985 | Engel et al. | 123/527 |
| 4,523,548 A | * | 6/1985 | Engel et al. | 123/527 |
| 5,623,909 A | * | 4/1997 | Wertheimer | 123/527 |
| 6,196,205 B1 | * | 3/2001 | Volker | 123/527 |
| 6,269,300 B1 | * | 7/2001 | Moore-McKee et al. | 123/527 |
| 6,523,528 B1 | * | 2/2003 | Wolters | 123/527 |
| 2003/0188714 A1 | * | 10/2003 | Yamamoto et al. | 123/527 |
| 2004/0139951 A1 | * | 7/2004 | Fisher et al. | 123/527 |
| 2005/0205021 A1 | * | 9/2005 | Shute | 123/27 GE |

* cited by examiner

*Primary Examiner*—Willis R. Wolfe, Jr.
(74) *Attorney, Agent, or Firm*—Shoemaker and Mattare

(57) ABSTRACT

A gaseous fuel control system for regulating fuel flow to a dual fuel internal combustion engine has a phase converter for converting the fuel from a liquid state to a gaseous state and control means for controlling the supply of fuel to the engine in response to sensor signals including a throttle position signal and an alternator signal. A valve actuated by the control means regulates the supply of said fuel in a gaseous state, which is mixed with air in the engine manifold. A display mounted in the vehicle cabin includes a fuel gauge, an override switch and means for adjusting the parameters for the control of supply of fuel. The control means is programmed to close the valve means, preventing the supply of said fuel, when the throttle position is in an idling position or substantially fully open and when the engine is not operating.

20 Claims, 4 Drawing Sheets

FIGURE 2

|  | Gov. speed | 1st Log | 2nd Log | 3rd Log | 4th Log |
|---|---|---|---|---|---|
| Engine speed (RPM) | 2100 | 1801 | 1599 | 1401 | 1166 |
| Vehicle speed (MPH) | 55 | 46 | 42 | 37 | 31 |
| Fuel rate (GPH) | 25.0 | 27.5 | 26.8 | 23.4 | 19.6 |
| Manifold Pressure ("Hg) | 47.5 | 54.2 | 55.1 | 49.1 | 41.5 |
| Fuel Pressure (PSI) | 92.8 | 90.6 | 89.1 | 87.6 | 83.8 |
| Fuel Temperature (oF) | 78 | 76 | 73 | 70 | 68 |
| Air Temperature (oF) | 134 | 138 | 129 | 117 | 103 |
| Engine HP | 540 | 575 | 581 | 518 | 441 |
| Corrected HP | 535 | 588 | 573 | 509 | 433 |
| Wheel HP - measured | 433 | 489 | 494 | 448 | 383 |
| Wheel HP - corrected | 438 | 499 | 496 | 444 | 376 |
| Inlet Air Restriction | -12.7 | -11.2 | -9.4 | -7 | -4.5 |

FIGURE 3

|  | Gov. speed | 1st Log | 2nd Log | 3rd Log | 4th Log |
|---|---|---|---|---|---|
| Engine speed (RPM) | 2098 | 1802 | 1601 | 1395 | 1186 |
| Vehicle speed (MPH) | 55 | 48 | 42 | 37 | 31 |
| Fuel rate (GPH) | 25.5 | 28.5 | 26.2 | 22.3 | 19.4 |
| Manifold Pressure ("Hg) | 48.5 | 55.2 | 57.1 | 51 | 42 |
| Fuel Pressure (PSI) | 92 | 89.7 | 89.3 | 87.8 | 81.3 |
| Fuel Temperature (oF) | 111 | 108 | 99 | 92 | 87 |
| Air Temperature (oF) | 112 | 108 | 92 | 92 | 76 |
| Engine HP | 522 | 584 | 583 | 487 | 432 |
| Corrected HP | 535 | 588 | 570 | 490 | 433 |
| Wheel HP - measured | 488 | 524 | 528 | 478 | 400 |
| Wheel HP - corrected | 490 | 535 | 538 | 474 | 392 |
| Inlet Air Restriction | -12.4 | -12 | -10.1 | -8.9 | -4.3 |

——— Corrected wheel HP
——— Estimated maximum speed
——— Estimated minimum speed

——— Corrected wheel HP
——— Estimated maximum speed
——— Estimated minimum speed

FUEL CONTROL SYSTEM FOR A DUAL FUEL INTERNAL COMBUSTION ENGINE

FIELD OF INVENTION

The present invention relates to a fuel control system for controlling the supply of a gaseous fuel to a dual fuel internal combustion engine. The present invention has particular but not exclusive application for a fuel control system that controls the supply of liquefied petroleum gas (LPG) to a diesel combustion engine. LPG and diesel combustion engine are described in the specification by way of example only and the invention is not limited to these features.

BACKGROUND

Conventional internal combustion engines are inefficient in the combustion of their fuel. Compression ignition engines that use diesel fuel are particularly inefficient because of the relatively slow burning nature of the diesel fuel so that exhaust with incomplete burnt fuel is discharged. This problem is exacerbated when the vehicle is under load and more fuel is provided to the engine.

To address this problem, a dual fuel engine system was developed where LPG fuel was introduced to the engine to improve the efficiency of the combustion of the diesel fuel. Current dual fuel engines often operate on diesel only for part of the operating range of the engine and on the combined use of the diesel and LPG fuel for the rest of the operating range. In many situations LPG fuel flow rate is subject to limited or no control. In some dual fuel engines the LPG flow rate is controlled by the air intake rate to the engine. In contrast, other engines control the supply of LPG through the governor for the diesel fuel. These mechanisms in controlling the supply of LPG to a dual fuel engine system do not appear to adequately address safety issues, accessibility to the LPG supply controls nor optimize the efficiency of engine performance and fuel combustion.

OBJECT OF THE INVENTION

It is an object of the present invention to provide an alternative fuel control system which overcomes at least in part one or more of the aforementioned problems.

SUMMARY OF THE INVENTION

In one aspect the present invention broadly resides in a fuel control system for a dual fuel combustion engine of a vehicle comprising
  a fuel source of liquefied gas;
  a phase converter for converting the fuel from a liquid state to a gaseous state, said phase converter is in fluid communication with the fuel source;
  control means for controlling the supply of said fuel to the engine in response to one or more sensor signals, said sensor signals comprise a throttle position signal which indicates the position of the throttle with respect to load and an alternator signal which indicates the operational status of the engine;
  a valve means actuated by the control means to control the supply of said fuel in a gaseous state, said valve means is in fluid communication with said phase converter;
  mixer means for mixing the fuel in a gaseous state with air in the engine manifold, said mixer means is in fluid communication with the valve means;
  display means mountable in the vehicle cabin and operationally connected to the control means, said display means comprises a fuel gauge, an override switch and adjustment means for adjusting the parameters for the control of supply of said fuel; wherein the control means is programmed to close the valve means preventing the supply of said fuel when the throttle position is in an idling position or substantially fully open, and when the engine is not operating.

The control means preferably comprises a processor mounted within a housing. The housing preferably comprises the display means. The housing is preferably mountable within the vehicle cabin.

Preferably the liquefied gas is LPG but it can also be methane, propane or natural gas. The fuel sour/ce is preferably a fuel tank for storing liquefied gas.

The phase converter is preferably heated through a heat exchange from circulating water from the engine cooling system. The phase converter is preferably heated to substantially the same temperature as the engine to increase the efficiency of conversion and prevent the freezing of phase converter components during operation.

The throttle position signal is preferably actuated by the throttle position switch. The position of the throttle position switch depends on load inputs comprising whether the vehicle is accelerating, climbing an incline and requiring power, braking, in cruise control or idling.

The alternator signal is preferably actuated by the alternator sensor which determines whether the motor is on and running or off. Where the engine is off, the alternator sensor preferably signals the control means to stop any supply of the fuel. In this way the alternator sensor serves as a back up safety switch.

The valve means preferably comprises an electrically operated stepper motor and an electronic metering valve controlled by the stepper motor. The stepper motor is preferably re-zeroed and recalibrated each time an engine ignition is switched on.

The mixer means preferably comprises a mixer positioned in the inlet manifold after the air filter but before any turbo or super charger. With the passage of air through the air intake to the engine a partial vacuum is created in the mixer and consequently draws in the gaseous fuel.

The adjustment means preferably comprises a key pad displayed on the outer surface of the housing. Alternatively the adjustment means may comprise one or more displayed switches, gauges or dials.

The fuel control system preferably controls the supply of gaseous fuel but does not control the primary fuel such as diesel.

Preferably there is an electronic valve located between the fuel tank and the phase converter. The electronic valve preferably remains closed until the alternator sensor provides a signal via the control means to open the valve and allow the flow of fuel to the phase converter. A sensor signal is preferably provided when the engine is turned on. The electronic valve serves as an additional safety switch.

The fuel control system may also comprise a low water alarm which provides a signal when the water supplied from the engine cooling system is low. The low water alarm provides an alert that the phase converter is not being heated and that the engine may overheat. In a preferred form the low water alarm is a visual and/or audible signal within the cabin.

The fuel control system may also comprise a MAP sensor which is a vacuum load sensitive switch and senses engine load. The MAP sensor preferably senses the vacuum in the engine manifold.

The fuel control system may also comprise an OXY sensor which detects the presence or lack of oxygen in the exhaust. The OXY sensor preferably provides a signal to the control means regarding the amount of oxygen in the exhaust emissions. The control means preferably processes the signal in concert with other signals and regulates the supply of gas. Where the OXY sensor signals that there is a significant oxygen concentration in the exhaust emissions, the control means may respond by increasing the amount of gas entering the engine. On the other hand, if the OXY sensor signals that there is a lack of oxygen in the exhaust emissions, the control means may respond by decreasing the amount of gas entering the engine.

The fuel control system may also comprise a knock sensor which measures whether there is a significant amount of knocking during combustion. Where there is a significant amount of knocking the control means responds by reducing or stopping the supply of gas to the engine.

In another aspect the invention broadly resides in a method of controlling the supply of gas to a dual fuel engine using the aforementioned fuel control system, said method comprising
supplying liquefied gas from the fuel source to the phase converter;
converting the liquefied gas to a gaseous state;
supplying the gas to the engine via the valve means and mixer means in amounts determined by the control means with respect to processing of signals from one or more sensors.

BRIEF DESCRIPTION OF THE DRAWINGS

In order that the present invention be more readily understood and put into practical effect, reference will now be made to the accompanying drawings wherein:

FIG. 2 is a table showing measured engine and vehicle performance parameters without using the fuel control system;

FIG. 3 is a table showing measured engine and vehicle performance parameters with using the fuel control system;

DETAILED DESCRIPTION OF THE PREFERRED EMBODIMENT

The preferred embodiment of the fuel control system is a system of regulating the amount of LPG that flows to the dual fuel engine so to improve the efficiency of fuel consumption and combustion. The fuel control system of the current invention is employed on dual fuel engines and is used where a supplementary gaseous fuel is used in conjunction with a primary fuel such as diesel. The supplementary gaseous fuel is not used on its own but only in conjunction with a primary fuel to increase power and fuel consumption efficiency.

Figure 1:
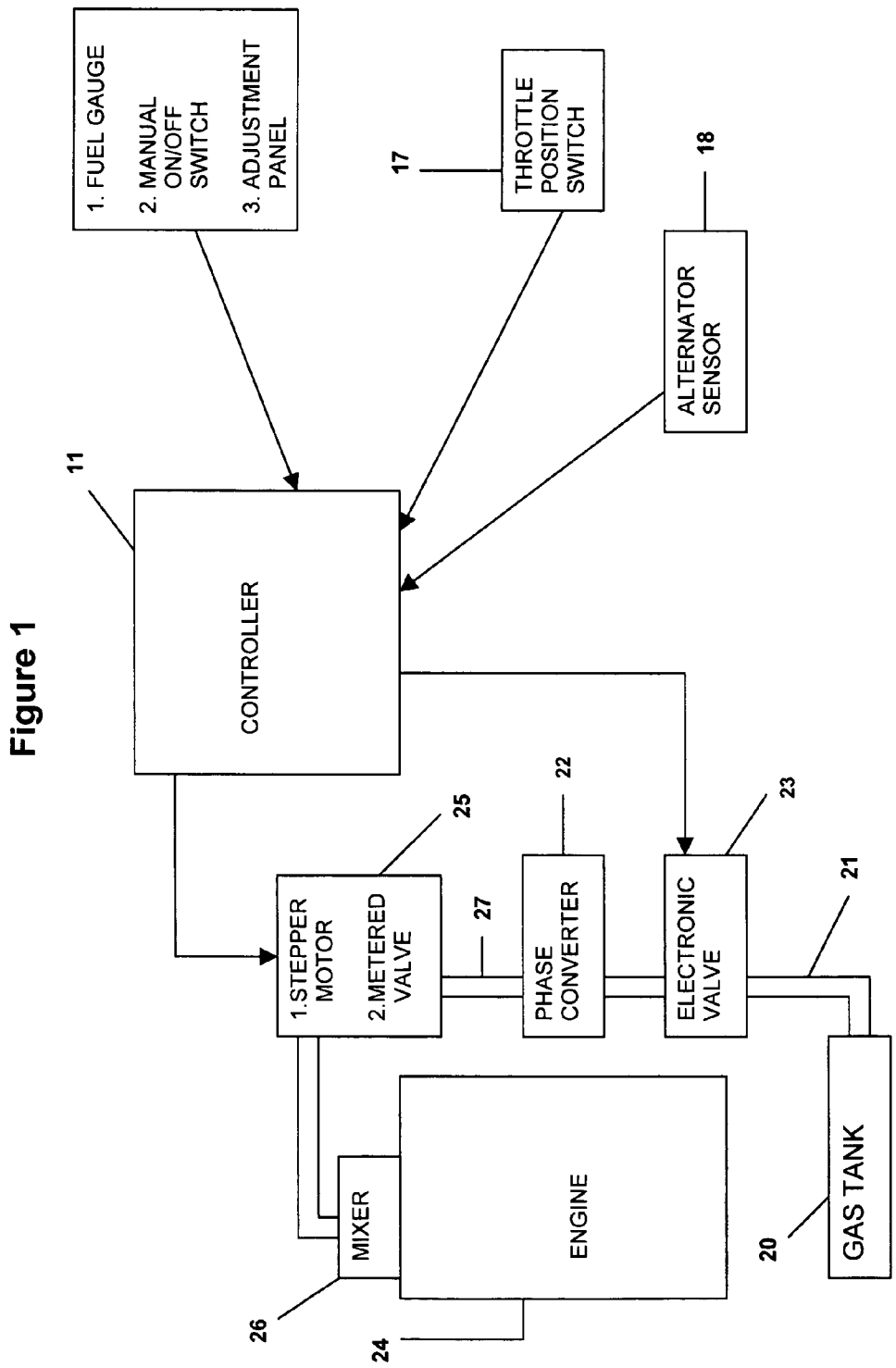
FIG. 1 is a diagrammatic view of the fuel control system.
Figure 6:
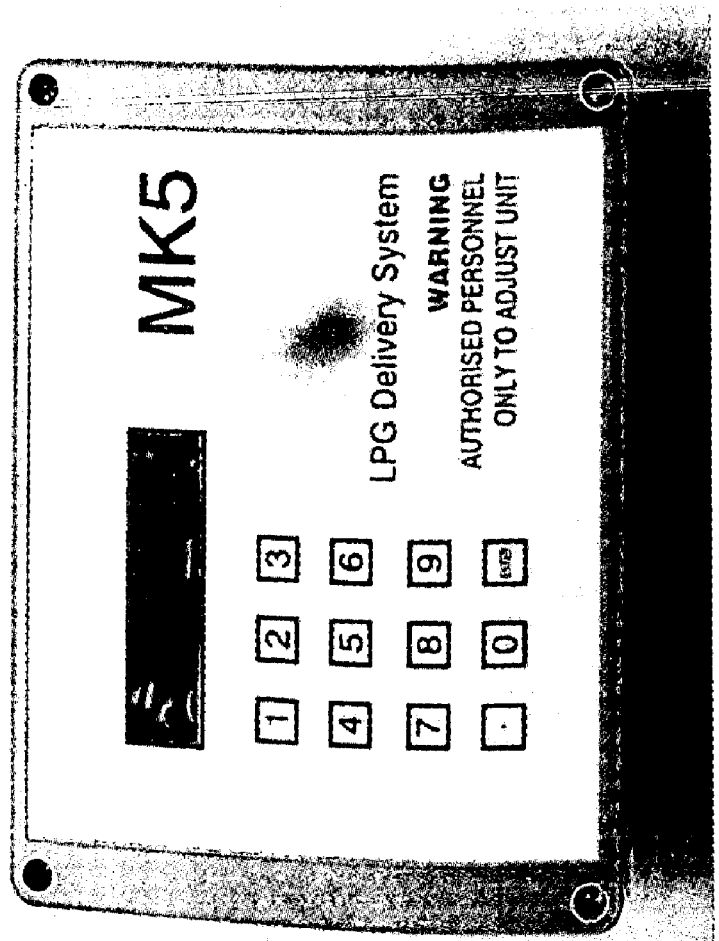
FIG. 6 is a photograph of a controller showing the key pad panel.

The fuel control system is shown diagrammatically in FIG. 1. The fuel control system has a controller 11 which is a processor that processes signals from several sensors and controls the supply of LPG according to the processor results. The controller 11 has a fiberglass outer casing 12 in which the processor is mounted. The fiberglass outer casing 12 protects the processor from shock and dust and particulate contamination. The outer face 13 of one side of the casing 12 has a ten digit key pad 14 for adjusting the parameters for the processing of sensor data. Entry of data into the key pad 14 is prevented by security code protection to avoid tampering. The outer face 13 also has a LED display fuel gauge 15 that measures the amount of LPG in the tank. As well, the outer face 13 has a manual override switch (not shown) that allows the supply of LPG to the engine to be shut off. In some embodiments there is an LCD display to show the stepper motor position and accelerator pedal position. The controller 11 also has several sensory input jacks and one or more output jacks. The controller 11 is mounted to the dashboard within the cabin of the vehicle. An example of the controller 11 is shown in the photograph of FIG. 6.

The controller 11 receives sensory signals from the throttle position switch 17 which senses the accelerator pedal position. The controller 11 also receives an alternator sensor signal 18 which senses whether the engine is running or off. In the situation where the engine is off, the alternator sensor 18 provides a signal to the controller 11 and the controller 11 subsequently shuts off the supply of LPG to the engine.

LPG is stored in a liquid form in storage tank 20. A fuel pipe 21 connects the storage tank 20 to the phase converter 22 via an electronic valve 23. The electronic valve 23 is a standard solenoid valve opening and closing in response to an electronic signal. The electronic valve 23 opens and closes in response to signals from the alternator sensor 18 via the controller 11 and serves as a safety switch to contain LPG. When the ignition is turned on and the engine is running the electronic valve 23 is opened and LPG flows to the phase converter 22. The phase converter 22 is connected to the intake manifold of the engine 24 through the stepper motor and metered valve 25. The stepper motor is electrically connected to a conical solenoid metering valve and the stepper motor controls the degree of opening of the metering valve. The stepper motor and metered valve 25 are actuated by the controller 11 in response to the sensor signals. The stepper motor and metered valve 25 allow a defined amount of LPG in the gaseous form through to the engine 24. The LPG in gaseous form is mixed with air at the mixer 26 as it is introduced into the intake manifold of the engine 24. Gas pipe 27 connects the phase converter 22 to the engine 24.

In other embodiments the fuel control system may also comprise additional sensors such as cruise control sensors, brake sensors, knock sensor, water temperature sensor and oxy sensor. The cruise control sensor is associated with the throttle control sensor and brake sensor. The cruise control sensor indicates when cruise control has been activated. When the cruise control has been activated, the vehicle speed has been set and the throttle control is opened and closed to maintain the fixed speed. When the brake is applied the cruise control is deactivated, with the controller relying on the throttle control switch.

Experiment 1

To determine the effect of the fuel control system on a dual fuel combustion engine, a vehicle with a dual fuel engine was tested with and without engagement of the fuel control system under similar conditions. The engine tested was a Caterpillar C-15 air to air after-cooled, direct injection diesel engine and the vehicle configuration was a Fuller-RTLQ20918B manual transmission with two drive axles and an axle ratio of 4.56. The weight on the axles was 8000 kg and radial tyres with a highway tread were used. The gas used as the supplementary fuel was propane.

Figure 4:
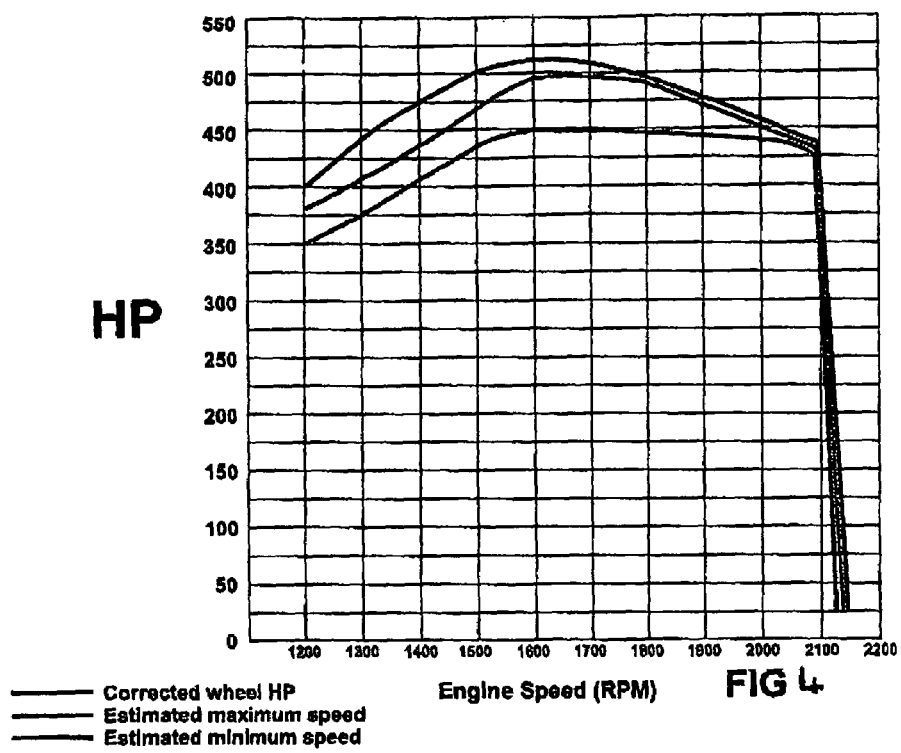
FIG. 4 is a graphical representation of horse power generated by the vehicle at various engine speeds without using the fuel control system.
Figure 5:
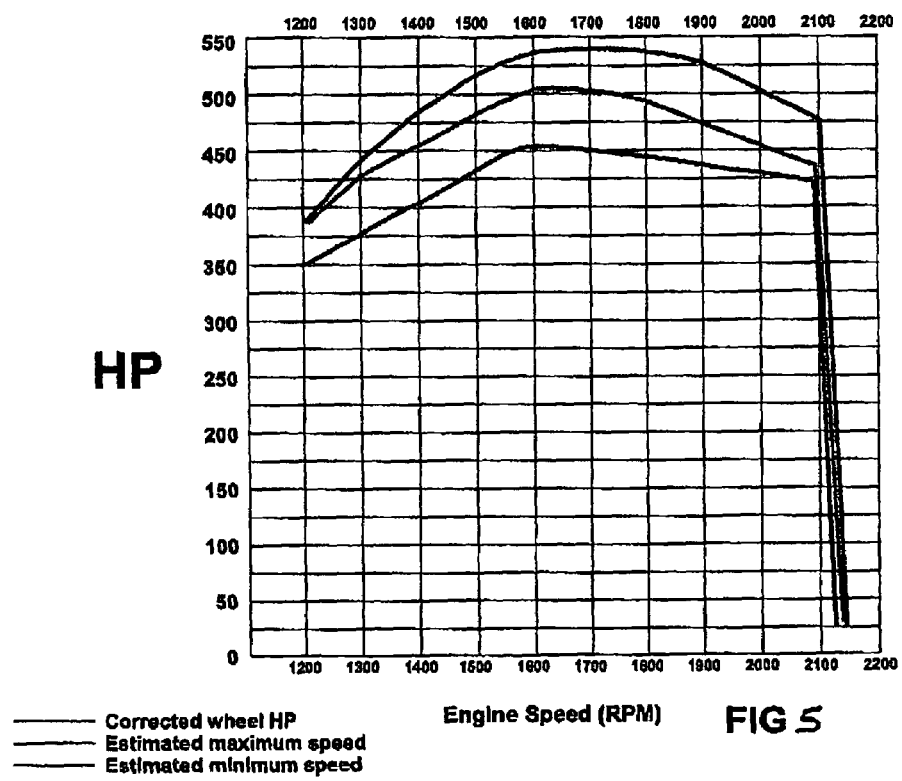
FIG. 5 is a graphical representation of horse power generated by the vehicle at various engine speeds with using the fuel control system.

The results of the experiment are shown in FIGS. 2 and 4 for the vehicle when no fuel control system was engaged and FIGS. 3 and 5 for the vehicle when the fuel control system was engaged. With engagement of the fuel control system, a comparatively higher engine horsepower was achieved by more efficient combustion of the fuel. Thus to achieve the same power as a conventional diesel engine, a dual fuel diesel engine would require less diesel thereby increasing the diesel fuel consumption efficiency. Furthermore, comparatively higher horsepower is reached when the fuel control system is engaged, thereby providing a higher torque for the engine. From the results it is also noted that the comparatively higher engine horsepower achieved with the fuel control system is maintained for a longer period compared with the horsepower produced by conventional diesel engines under similar conditions. The corrected wheel horsepower values for a given engine speed in increased by employment of the fuel control system and the fuel consumption rate is comparatively decreased with different engine speeds.

Experiment 2

A further experiment was conducted using a SCANIA 113 vehicle with an 11 liter diesel engine. The vehicle comprised a trailer and hauled a load from Brisbane to Darwin and return. A comparison was made of using diesel only and diesel supplemented with LPG. Without engagement of the fuel control system the diesel consumption was 1.7 km/L and with using the dual fuel system the diesel and LPG consumption was 2.2 km/L. With the use of diesel and LPG and employment of the dual fuel control system, the exhaust emissions were comparatively cleaner and there was no obvious soot deposited on the trailer. With the dual fuel system the engine ran at a temperature 4 degrees cooler than if diesel was used alone. With a comparatively cooler engine the vehicle was able to sustain hard pulling in hot conditions such as driving through hot and adverse conditions. Without using a dual fuel system the vehicle would normally be stopped periodically to allow the engine to cool. As well, the engine oil remained comparatively clean when a dual fuel system was employed, which in part is attributed to the running of the engine at lower temperatures.

Advantages

The advantages of the preferred embodiment of the fuel control system comprise a decrease in fuel consumption, an increase in power provided per unit of fuel consumed, a relatively cleaner engine from using a dual fuel system, the ability to use diesel only, a cooler running engine, the provision of a manual override switch in the cabin so that the driver may turn off the supply of gas to the engine and automatic turning off of the supply of gas when the throttle is fully open to avoid overheating of the engine and problems associated with engine governors.

Variations

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

We claim:

1. A fuel control system for a dual fuel combustion engine of a vehicle comprising
   a fuel source of liquefied gas;
   a phase converter for converting the fuel from a liquid state to a gaseous state, said phase converter is in fluid communication with the fuel source;
   control means for controlling the supply of said fuel to the engine in response to one or more sensor signals, said sensor signals comprise a throttle position signal which indicates the position of the throttle with respect to load and an alternator signal which indicates the operational status of the engine;
   a valve means actuated by the control means to control the supply of said fuel in a gaseous state, said valve means is in fluid communication with said phase converter;
   mixer means for mixing the fuel in a gaseous state with air in the engine manifold, said mixer means is in fluid communication with the valve means;
   display means mountable in the vehicle cabin and operationally connected to the control means, said display means comprises a fuel gauge, an override switch and adjustment means for adjusting the parameters for the control of supply of said fuel; wherein the control means is programmed to close the valve means preventing the supply of said fuel when the throttle position is in an idling position or substantially fully open, and when the engine is not operating.

2. A fuel control system as claimed in claim 1 wherein the phase converter is heated through a heat exchange from circulating water from the engine cooling system.

3. A fuel control system as claimed in claim 1 wherein the phase converter is heated through a heat exchange from circulating water from the engine cooling system, said phase converter is heatable to substantially the same temperature as the engine to increase the efficiency of conversion and prevent the freezing of phase converter components during operation.

4. A fuel control system as claimed in claim 1 wherein the throttle position signal is actuated by the throttle position switch and its position depends on load inputs comprising whether the vehicle is accelerating, climbing an incline and requiring power, braking, in cruise control or idling.

5. A fuel control system as claimed in claim 1 wherein the mixer means comprises a mixer positioned in the inlet manifold after the air filter but before any turbo or super charger.

6. A fuel control system as claimed in claim 1 wherein the fuel control system controls the supply of gaseous fuel but not the primary fuel.

7. A fuel control system as claimed in claim 1 wherein there is a low water alarm which provides a signal when the water supplied from the engine cooling system is low and the engine may overheat.

8. A fuel control system as claimed in claim 1 wherein there is a low water alarm which provides a signal when the water supplied from the engine cooling system is low and the engine may overheat, said low water alarm is a visual or audible signal within the cabin.

9. A fuel control system as claimed in claim 1 wherein there is a MAP sensor which is a vacuum load sensitive switch and senses engine load, said MAP sensor senses the vacuum in the engine manifold.

10. A fuel control system as claimed in claim 1 wherein there is an OXY sensor which detects the presence or lack of oxygen in the exhaust, said OXY sensor provides a signal to the control means regarding the amount of oxygen in the exhaust emissions; the control means preferably processes the signal in concert with other signals and regulates the supply of gas; where the OXY sensor signals that there is a significant oxygen concentration in the exhaust emissions, the control means may respond by increasing the amount of gas entering the engine; on the other hand, if the OXY sensor signals that there is a lack of oxygen in the exhaust emissions, the control means may respond by decreasing the amount of gas entering the engine.

11. A fuel control system as claimed in claim 1 wherein there is an OXY sensor which detects the presence or lack of oxygen in the exhaust, said OXY sensor provides a signal to the control means regarding the amount of oxygen in the exhaust emissions; when the OXY sensor signals that there is a significant oxygen concentration in the exhaust emissions, the control means responds by increasing the amount of gas entering the engine and when the OXY sensor signals that there is a lack of oxygen in the exhaust emissions, the control means responds by decreasing the amount of gas entering the engine.

12. A fuel control system as claimed in claim 1 wherein there is a knock sensor which measures whether there is a significant amount of knocking during combustion and when there is a significant amount of knocking the control means responds by reducing or stopping the supply of gas to the engine.

13. A fuel control system as claimed in claim 1 wherein the liquefied gas is LPG.

14. A fuel control system as claimed in claim 1 wherein the control means comprises a processor mounted within a housing, said housing comprises the display means, said housing is mountable within the vehicle cabin.

15. A fuel control system as claimed in claim 14 wherein the adjustment means comprises a key pad displayed on the outer surface of the housing.

16. A fuel control system as claimed in claim 1 wherein the valve means comprises an electrically operated stepper motor and an electronic metering valve controlled by the stepper motor.

17. A fuel control system as claimed in claim 16 wherein the stepper motor is re-zeroed and recalibrated each time an engine ignition is switched on.

18. A fuel control system as claimed in claim 1 wherein the alternator signal is actuated by an alternator sensor which determines whether the motor is on and running or off, wherein the alternator sensor signals the control means to stop any supply of the fuel when the engine is off.

19. A fuel control system as claimed in claim 18 wherein there is an electronic valve located between the fuel tank and the phase converter, said electronic valve remains closed until the alternator sensor provides a signal via the control means to open the valve and allow the flow of fuel to the phase converter.

20. A fuel control system as claimed in claim 18 wherein there is an electronic valve located between the fuel tank and the phase converter, said electronic valve remains closed until the alternator sensor provides a signal via the control means to open the valve and allow the flow of fuel to the phase converter, said sensor signal is provided when the engine is turned on.

* * * * *